(12) United States Patent
Johansson et al.

(10) Patent No.: US 12,086,680 B2
(45) Date of Patent: Sep. 10, 2024

(54) TOOL PART, SYSTEM, METHOD AND COMPUTER PROGRAM PRODUCT FOR DETERMINING A TOOL WEAR

(71) Applicant: SECO TOOLS AB, Fagersta (SE)

(72) Inventors: Daniel Johansson, Fagersta (SE); Soren Hagglund, Fagersta (SE); Gerrit Kremer, Fagersta (SE)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 17/923,101

(22) PCT Filed: Apr. 23, 2021

(86) PCT No.: PCT/EP2021/060680
§ 371 (c)(1),
(2) Date: Nov. 3, 2022

(87) PCT Pub. No.: WO2021/224030
PCT Pub. Date: Nov. 11, 2021

(65) Prior Publication Data
US 2023/0196043 A1    Jun. 22, 2023

(30) Foreign Application Priority Data
May 6, 2020    (EP) ..................... 20173165

(51) Int. Cl.
*G06K 7/14*    (2006.01)
*B23B 49/00*    (2006.01)
*G06K 19/06*    (2006.01)

(52) U.S. Cl.
CPC ............ *G06K 7/1417* (2013.01); *B23B 49/00* (2013.01); *G06K 19/06121* (2013.01);
(Continued)

(58) Field of Classification Search
None
See application file for complete search history.

(56) References Cited

U.S. PATENT DOCUMENTS 5,825,017 A    10/1998    Pryor
2011/0315261 A1*    12/2011    Coleman ............... E21B 17/006
                                                                            138/104
(Continued)

FOREIGN PATENT DOCUMENTS

DE    202010005689 U1    1/2011
DE    102017218900 A1 *    5/2018
JP    2020044643 A *    3/2020

OTHER PUBLICATIONS

Machine translation of DE 102017218900, retrieved from European Patent Office, retrieved Sep. 23, 2023 (Year: 2023).*

(Continued)

*Primary Examiner* — Suezu Ellis
(74) *Attorney, Agent, or Firm* — Corinne R. Gorski

(57) ABSTRACT

The disclosure relates to a tool part for a cutting tool having an identification marker arranged at the tool part, wherein the identification marker is a unique machine readable code associated with individual dimension information data. The individual dimension information data includes at least one individually measured dimension of the tool part as measured when manufacturing the tool part that will change while wearing the tool part. The disclosure further relates to a system, a method and computer program product for utilizing an identification marker on a tool part for a cutting tool, for determining a tool wear of the tool part.

12 Claims, 5 Drawing Sheets

(52) U.S. Cl.
CPC ............... *B23B 2270/36* (2013.01); *G05B 2219/37256* (2013.01); *G05B 2219/37258* (2013.01); *G05B 2219/37559* (2013.01)

(56) References Cited

U.S. PATENT DOCUMENTS

| | | | |
|---|---|---|---|
| 2023/0088887 A1* | 3/2023 | Stenberg | E21B 17/006 |
| 2023/0205162 A1* | 6/2023 | Baudin | G05B 19/128 |
| | | | 235/451 |

OTHER PUBLICATIONS

Machine translation of JP 20200044643, retrieved from European Patent Office, retrieved Sep. 24, 2023 (Year: 2023).*

* cited by examiner

TOOL PART, SYSTEM, METHOD AND COMPUTER PROGRAM PRODUCT FOR DETERMINING A TOOL WEAR

RELATED APPLICATION DATA

This application is a § 371 National Stage Application of PCT International Application No. PCT/EP2021/060680 filed Apr. 23, 2021 with priority to EP 20173165.0 filed May 6, 2020.

TECHNICAL FIELD

The present disclosure relates to a tool part, system, method and computer program product for determining a tool wear of a tool part during usage of the tool part.

BACKGROUND ART

Today tools are used to process material and there are different kinds of tools and different kinds of processing of material. A tool may comprise one or plural tool parts that are worn when the tool is used. Often when a tool part is used to process a material there is a certain wear of the tool part associated with the usage of the tool part.

A plurality of machine operations involves use of tools parts. It is of importance that the tool part used in the machine operation is operating according to desired characteristics of the tool part. Since certain wear of a tool part changes the characteristics of the tool part over time it is sometimes desired to control that the wear of the tool part is acceptable or if the tool part needs to be replaced by a new tool part for example.

Today there is a lot of manual handling of tools in machine operations. In order to determine the tool wear of a tool part, the tool part is sometimes measured manually e.g. by an operator of a machine before using the tool part in a machine operation.

Today tool wear is often manually determined by an initial measurement of the tool part before usage of the tool part, followed by a follow up measurement of the tool part after certain usage of the tool part. The measurements are often done manually. One problem with the existing solutions is that it can be difficult to keep track of initial measurements, and e.g. to associate a certain initial measurement with the certain tool part. It is also time consuming to do manual measurement of the tool parts.

SUMMARY

One example of machine operations are operations by machines with cutting tools that are configured to remove chips from a piece of material during the machine operation by the cutting tool. A typical example is a tool comprising a tool holder and one or more tool parts that are worn during usage of the cutting tool in the machine operation. In an example, a machine for cutting may require that a predetermined wear threshold has not yet been reached for a tool part before starting a machine operation by the tool part. In the example, a cutting tool may comprise one or more cutting inserts attached at a tool holder, and the cutting insert may have one or plural cutting edges that are worn during usage in the machine operation. Each cutting edge is worn when the cutting edge is used for removing chips from a piece of material during the machine operation. In order to avoid damage of the cutting tool and/or the piece of material it is often required that an operator of a cutting machine frequently controls the wear of each cutting edge during the machine operation. This is often done by visual inspection and by manual measurements e.g. by the operator of the machine, before the machine operation can be started by the operator.

In the example of cutting tools, that are configured to remove chips from a piece of material during the machine operation by the cutting tool, it is often needed to preform plural follow up measurements in order to keep track of the wear of a cutting tool part so that e.g. the cutting tool part still performs within required tolerances on quality when performing the machine operation. When a predetermined wear threshold has been reached, the cutting tool part may need to be replaced.

A first drawback of current approaches is that the wear of a cutting tool part can be erroneously measured, and further an initial measurement of a first cutting tool part may be mixed up by an initial measurement of a second cutting tool part etc. This erroneously handling of the wear of a cutting tool part may cause severe damage to both the cutting tool part but also to the piece of material being processed by the cutting tool part.

A second drawback of current approaches is that even if e.g. an operator verifies that the tool part has not yet reached a predetermined wear threshold, the human error factor is one factor that can lead to an erroneously measurement of a tool part that e.g. should have been replaced.

A third drawback of the current approaches is that a lot of time is spent measuring the cutting tool parts. This time is costly and adds time to total manufacturing process of a product.

It is an object of some embodiments to solve or mitigate, alleviate, or eliminate at least some of the above or other drawbacks.

The inventors have come up with a solution that decreases the risk of human errors and that can also reduce the time needed for measuring the wear of a tool part. In the following, aspects and embodiments will be presented where alternative approaches for decreasing the risk of human errors measuring the wear of a tool part are described.

According to a first aspect there is provided a tool part for a cutting tool comprising an identification marker arranged at the tool part wherein the identification marker is a unique machine readable code associated with individual dimension information data, wherein the individual dimension information data comprises at least one individually measured dimension of the tool part as measured when manufacturing the tool part that will change while wearing the tool part.

One advantage with this aspect is that each individual tool part is associated with a unique machine readable code which in turn can be associated with individual dimension information data for that specific individual tool part. This eliminates the need for an initial measurement of the dimension of the tool part before usage of the tool part, which in turn saves time and reduces measurement errors caused by e.g. a human.

According to some embodiments, the individual dimension information data is coded in the machine readable code and the machine readable code is configured to be read by a camera and decoded by an electronic device configured to be in communication with the camera.

One advantage with this embodiment is that individual dimension information data can be obtained by a device which enables usage of the individual dimension information data by e.g. a machine and at the same time limits the need for human interaction which minimizes the risk of human errors.

According to a second aspect there is provided a system for utilizing an identification marker on a tool part for a cutting tool for determining a tool wear of the tool part. The system comprises a camera for obtaining image data and reading a machine readable code, an electronic device configured to be connected with the camera, the electronic device having a processing circuitry configured to cause the system to detect, by the camera, an identification marker at the tool part wherein the identification marker is a unique machine readable code. The processing circuitry is further configured to cause the system to read, by the camera, the unique machine readable code of the identification marker, obtain, from the unique machine readable code, individual dimension information data comprising at least one individually measured dimension associated with the tool part as measured when manufacturing the tool part.

One advantage with this embodiment is that a tool wear can be determined using the individual dimension information data comprising at least one individually measured dimension associated with the tool part as measured when manufacturing the tool part without a need for an initial measurement of the dimension of the tool part before usage of the tool part, since at least one individually measured dimension before usage of the tool part is already known. This in turn saves time and reduces measurement errors caused by e.g. a human, and the image processing of the image data of the tool part further reduces measurement errors caused by e.g. a human.

According to some embodiments the processing circuitry is further configured to cause the system to obtain, by the camera, image data of the tool part, obtain a current dimension information data of the tool part comprising at least one current dimension associated with the tool part by performing image processing of the image data of the tool part, and determine tool wear data by comparing the current dimension information data with the individual dimension information data of the tool part.

One advantage with this embodiment is that a tool wear can be determined by comparing a specific dimension associated with the tool part as measured when manufacturing that specific individual tool part and compare this dimension with the current dimension of the tool part, using the current dimension information data. This eliminates e.g. the need for an initial measurement of the dimension of the tool part before usage of the tool part which in turn saves time and reduces measurement errors caused by e.g. a human, and the image processing of the image data of the tool part further reduces measurement errors caused by e.g. a human.

According to some embodiments, the individual dimension information data is obtained by decoding the unique machine readable code of the identification marker and from the decoded information obtain the individual dimension information data.

One advantage with this embodiment is that information about the individual dimension can be coded and stored in the unique machine readable code itself that is available on the tool part.

According to some embodiments, the individual dimension information data is obtained by comparing the unique machine readable code with association data comprising individual dimension information data associated with the unique machine readable code and obtaining the individual dimension information data from a memory.

One advantage with this embodiment is that information about the individual dimension can be stored in a memory that e.g. is a remote memory, and the information data can be stored and managed by a tool part manufacturer for a tool part customer.

According to some embodiments, the current dimension information data of the tool part is determined by using the dimension of the identification marker itself as a dimension reference for obtaining at least one current dimension associated with the tool part.

One advantage with this embodiment is that the identification marker at the tool part can be obtained by the camera and comprised in the image data of the tool part to be used in the image processing of the image data of the tool part, and with knowledge of the dimension of the identification marker itself, the identification marker itself can be used as a scale for obtaining a current dimension associated with the tool part. This eliminates e.g. the need for an initial measurement of the dimension of the tool part before usage of the tool part and eliminates the need for a follow up manual measurement, which in turn saves time and reduces measurement errors caused by e.g. a human. The image processing of the image data of the tool part further reduces measurement errors caused by e.g. a human.

According to some embodiments, the dimension of the identification marker itself is measured when manufacturing the tool part and comprised in the individual dimension information data.

One advantage with this embodiment is that e.g. the need for a measurement of the dimension of the identification marker itself before or during usage of the tool part is eliminated, which saves time and reduces measurement errors caused by e.g. a human.

According to some embodiments, the current dimension information data of the tool part is determined by using at least one individually measured dimension of the tool part as measured when manufacturing the tool part as dimension reference for obtaining at least one current dimension associated with the tool part.

One advantage with this embodiment is that one individually measured dimension at the tool part can be obtained by the camera and be comprised in the image data of the tool part to be used in the image processing of the image data of the tool part, and with knowledge of the dimension of the individually measured dimension of the tool part as measured when manufacturing the tool part, the individually measured dimension can be used as a scale for obtaining a current dimension associated with the tool part. This eliminates e.g. the need for an initial measurement of the dimension of the tool part before usage of the tool part and eliminates the need for a follow up manual measurement, which in turn saves time and reduces measurement errors caused by e.g. a human. The image processing of the image data of the tool part further reduces measurement errors caused by e.g. a human.

According to some embodiments, the dimension reference is a predetermined dimension of the tool part that maintains unchanged while wearing the tool part.

One advantage with this aspect is a tool wear, based on one current dimension obtained by the image processing, can be determined using predetermined dimension of the tool part that is not worn by using the tool part which will continue to function as a dimension reference during the whole lifetime of the tool part.

According to a third aspect there is provided a method for utilizing an identification marker on a tool part for determining a tool wear of the tool part. The method comprising detecting, by a camera, an identification marker at a tool part wherein the identification marker is a unique machine readable code and reading, by the camera, the unique machine readable code of the identification marker. The method further comprising obtaining, from the unique machine readable code, individual dimension information data comprising at least one individual dimension associated with the tool part as measured when manufacturing the tool part and obtaining, by the camera, image data of the tool part. The method further comprising obtaining a current dimension information data of the tool part comprising at least one current dimension associated with the tool part by performing image processing of the image data of the tool part, and determining tool wear data by comparing the current dimension information data with the individual dimension information data of the tool part.

One advantage with this embodiment is that a tool wear can be determined by comparing a specific dimension associated with the tool part as measured when manufacturing that specific individual tool part and compare this dimension with the current dimension of the tool part, using the current dimension information data. This eliminates e.g. the need for an initial measurement of the dimension of the tool part before usage of the tool part which in turn saves time and reduces measurement errors caused by e.g. a human, and the image processing of the image data of the tool part further reduces measurement errors caused by e.g. a human.

According to some embodiments, wherein the current dimension information data of the tool part is determined by using the actual dimension of the identification marker itself as a dimension reference for obtaining at least one current dimension associated with the tool part.

One advantage with this embodiment is that the identification marker at the tool part can be obtained by the camera and be comprised in the image data of the tool part to be used in the image processing of the image data of the tool part, and with knowledge of the dimension of the identification marker itself, the identification marker itself can be used as a scale for obtaining a current dimension associated with the tool part. This eliminates e.g. the need for an initial measurement of the dimension of the tool part before usage of the tool part and eliminates the need for a follow up manual measurement, which in turn saves time and reduces measurement errors caused by e.g. a human. The image processing of the image data of the tool part further reduces measurement errors caused by e.g. a human.

According to some embodiments, wherein the dimension of the identification marker itself is measured when manufacturing the tool part and comprised in the individual dimension information data.

One advantage with this embodiment is that e.g. the need for a measurement of the dimension of the identification marker itself before or during usage of the tool part is eliminated, which saves time and reduces measurement errors caused by e.g. a human.

According to some embodiments, the current dimension information data of the tool part is determined by using at least one individually measured dimension of the tool part as measured when manufacturing the tool part as dimension reference for obtaining at least one current dimension associated with the tool part.

One advantage with this embodiment is that one individually measured dimension at the tool part can be obtained by the camera and comprised in the image data of the tool part to be used in the image processing of the image data of the tool part, and with knowledge of the dimension of the individually measured dimension of the tool part as measured when manufacturing the tool part, the individually measured dimension can be used as a scale for obtaining a current dimension associated with the tool part. This eliminates e.g. the need for an initial measurement of the dimension of the tool part before usage of the tool part and eliminates the need for a follow up manual measurement, which in turn saves time and reduces measurement errors caused by e.g. a human. The image processing of the image data of the tool part further reduces measurement errors caused by e.g. a human.

According to some embodiments, the dimension reference is a predetermined dimension of the tool part that maintains unchanged while wearing the tool part.

One advantage with this aspect is a tool wear, based on one current dimension obtained by the image processing, can be determined using predetermined dimension of the tool part that is not worn by using the tool part which will continue to function as a dimension reference during the whole lifetime of the tool part.

According to a fourth aspect there is provided a computer program product comprising a non-transitory computer readable medium, having thereon a computer program comprising program instructions, the computer program being loadable into a processing circuitry and configured to cause execution of the method when the computer program is run by the processing circuitry.

Effects and features of the second through fourth aspects are to a large extent analogous to those described above in connection with the first aspect. Embodiments mentioned in relation to the first aspect are largely compatible with the second through fourth aspects.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Example tool parts for use in a machine operation will now be described for illustrative purpose, to visualize and exemplify the prior art and the aspects of the disclosure. It is understood that the aspects of the disclosure can be applied to any tool part in any machine operation.

In the example, and in the following description, tool parts for cutting are disclosed. Example machine operations are related to machines with cutting tools that are used to remove chips from a piece of material during the machine operation. Piece of material, as described herein, may typically comprise a work piece of metal to be processed, but the material may be any other material such as a plastic, stone or wood material. Machines, as described herein, may typically comprise a milling machine, a turning machine, a hole making machine, a threading machine or any other machine configured for processing a piece of material by a tool part.

Figure 1:
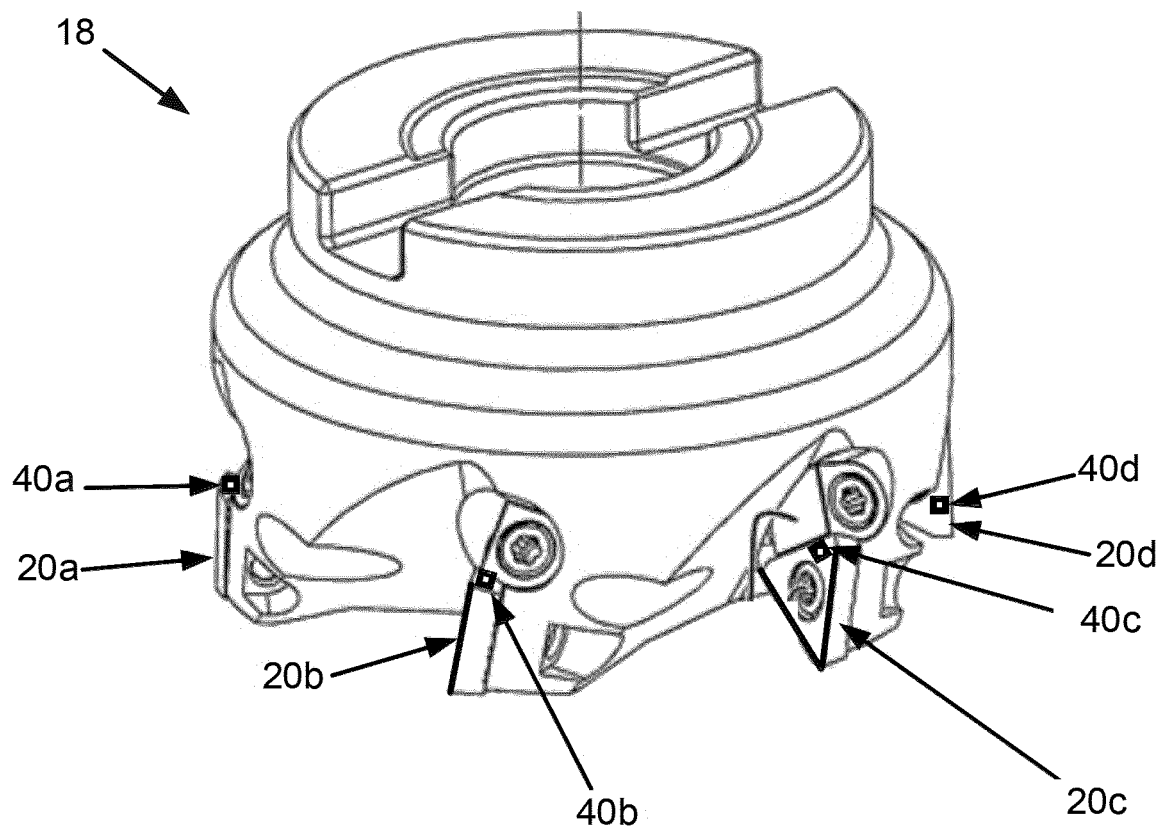
FIG. 1 illustrates example tool parts according to an embodiment of the present disclosure.

FIG. 1 illustrates example tool parts 20a,20b,20c,20d of a cutting tool 18. In the example, as illustrated in FIG. 1, the tool parts 20a,20b,20c,20d are cutting inserts.

Figure 2:
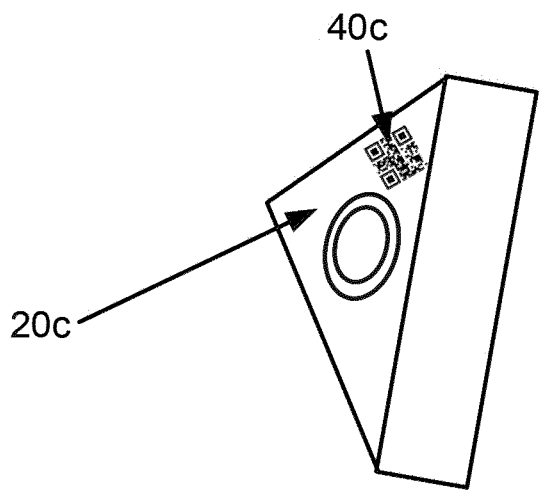
FIG. 2 illustrates an example tool part in form of a cutting insert with plural cutting edges according to an embodiment of the present disclosure.

Further, in the example as illustrated in FIG. 1 each cutting insert comprising at least one cutting edge. FIG. 2 illustrates an example tool part 20c in form of a cutting insert with at least one cutting edge according to an embodiment of the present disclosure. In the example, with reference to FIG. 1 and FIG. 2, each cutting edge of each cutting insert is configured to be used for removing chips from a piece of material.

In the example the cutting edges of the cutting inserts 20a,20b,20c,20d are worn when the cutting tool 18 is used to process the piece of material.

As mentioned above, today tool wear is often manually determined by an initial measurement of the tool part before usage of the tool part, followed by a follow up measurement of the tool part after certain usage of the tool part. In the example of cutting tool, it is often needed to preform plural follow up measurements in order to keep track of the wear of a tool part so that e.g. the tool part still performs within required tolerances on quality when performing the machine operation. When a predetermined wear threshold has been reached, the tool part may need to be replaced.

As mentioned above, a first drawback of current approaches is that the wear of a tool part can be erroneously measured, and further an initial measurement of a first tool part may be mixed up by an initial measurement of a second tool part etc. This erroneously handling of the wear of a tool part may cause severe damage to both the tool part but also to the piece of material being processed by the tool part.

As mentioned above, a second drawback of current approaches is that even if e.g. an operator verifies that the tool part has not yet reached a predetermined wear threshold, the human error factor is one factor that can lead to an erroneously measurement of a tool part that e.g. should have been replaced.

As mentioned above, a third drawback of the current approaches is that a lot of time is spent measuring the tool parts. This time is costly and adds time to total manufacturing process of a product.

It is an object of some embodiments to solve or mitigate, alleviate, or eliminate at least some of the above or other drawbacks.

The inventors have come up with a solution that decreases the risk of human errors and that can also reduce the time needed for measuring the wear of a tool part. In the following, aspects and embodiments will be presented where alternative approaches for decreasing the risk of human errors measuring the wear of a tool part are described.

The present disclosure relates to a tool part, system, method and computer program product for determining a tool wear of a tool part during usage of the tool part. According to some embodiments the tool wear of the tool part is a quantitative indication of a tool wear for quantifying the wear of a tool. According to some embodiments the tool wear of the tool part is given as a number. According to some embodiments the tool wear of the tool part is given as a dimension measurement number of a used tool part. According to some embodiments the tool wear of the tool part is given as a dimension measurement number of a used tool part in relation to a dimension measurement number of an unused tool part. According to some embodiments the tool wear of the tool part is given as a percentage number. In an example the percentage number is an indication of how much the tool part is worn in comparison to how much the tool part is allowed to be worn. According to some embodiments the tool wear of the tool part is given as a dimension measurement number of a used tool part in relation to a dimension measurement number of an unused tool part.

FIG. 1 illustrates example tool parts according to an embodiment of the present disclosure. In the example, as illustrated in FIG. 1, the tool parts 20a,20b,20c,20d are cutting inserts. FIG. 2 illustrates an example tool part in form of a cutting insert with plural cutting edges according to an embodiment of the present disclosure.

The first aspect of this disclosure shows a tool part 20a,20b,20c,20d for a cutting tool 18. According to some embodiments the tool part 20a,20b,20c,20d is any of a cutting insert, a cutting edge, a milling tool part, a drilling tool part, a drill chuck, a milling cutter chuck or a tool holder. The tool part 20a,20b,20c,20d comprising an identification marker 40a,40b,40c,40d arranged at the tool part 20a,20b,20c,20d.

According to some embodiments the identification marker 40a,40b,40c,40d is at least any of, or a combination of at least any of, a proprietary machine readable code, an open source machine readable code, a two dimensional code, a three dimensional code, an image a Quick Response code, a High Capacity Colored Two Dimensional Code, a European Article Number code, a Data Matrix code or a MaxiCode.

According to some embodiments the identification marker 40a,40b,40c,40d is etched at the tool part 20a,20b, 20c,20d. According to some embodiments the identification marker 40a,40b,40c,40d is a sticker attached at the tool part 20a,20b,20c,20d. According to some embodiments the identification marker 40a,40b,40c,40d painted at the tool part 20a,20b,20c,20d.

The identification marker 40a,40b,40c,40d is a unique machine readable code associated with individual dimension information data idID, wherein the individual dimension information data idID comprises at least one individually measured dimension of the tool part 20a,20b,20c,20d as measured when manufacturing the tool part 20a,20b,20c, 20d that will change while wearing the tool part 20a,20b, 20c,20d. This enables the identification marker 40a,40b,40c, 40d to be associated with individual dimension information data idID.

Hence, with this embodiment each individual tool part is associated with a unique machine readable code which in turn can be associated with individual dimension information data for that specific individual tool part. This eliminates the need for an initial measurement of the dimension of the tool part before usage of the tool part, which in turn saves time and reduces measurement errors caused by e.g. a human. Further since at least one individually measured dimension of the tool part 20a,20b,20c,20d as measured when manufacturing the tool part 20a,20b,20c,20d will change while wearing the tool part 20a,20b,20c,20d, the at least one individually measured dimension of the tool part 20a,20b,20c,20d can be used for determining a tool wear of the tool part 20a,20b,20c,20d.

According to some embodiments the tool part 20a,20b, 20c,20d is a cutting insert and the individual dimension information data idID comprises at least one individually measured dimension of the cutting insert as measured when manufacturing the cutting insert.

FIG. 2 illustrates an example tool part 20c in form of a cutting insert with at least one cutting edge according to an embodiment of the present disclosure. As illustrated in FIG. 2, the example tool part 20c comprising an identification marker 40c arranged at the tool part 20c. In FIG. 2, the identification marker 40c is arranged at the top surface of the tool part 20c. According to other embodiments, the identification marker 40c can be arranged at a circumferential side surface of the tool part 20c.

According to some embodiments the individual dimension information data idID is coded in the machine readable code and the machine readable code is configured to be read by a camera 10a,10b,10c and decoded by an electronic device 1a,1b,1c configured to be in communication with the camera 10a,10b,10c.

Hence, with this embodiment individual dimension information data can be obtained by a device which enables usage of the individual dimension information data by e.g. a machine and at the same time limit the need for human interaction which minimizes the risk of human errors.

The second aspect of this disclosure shows a system 100 for utilizing an identification marker 40a,40b,40c,40d on a tool part 20a,20b,20c,20d for a cutting tool for determining a tool wear of the tool part 20a,20b,20c,20d.

Figure 4A:
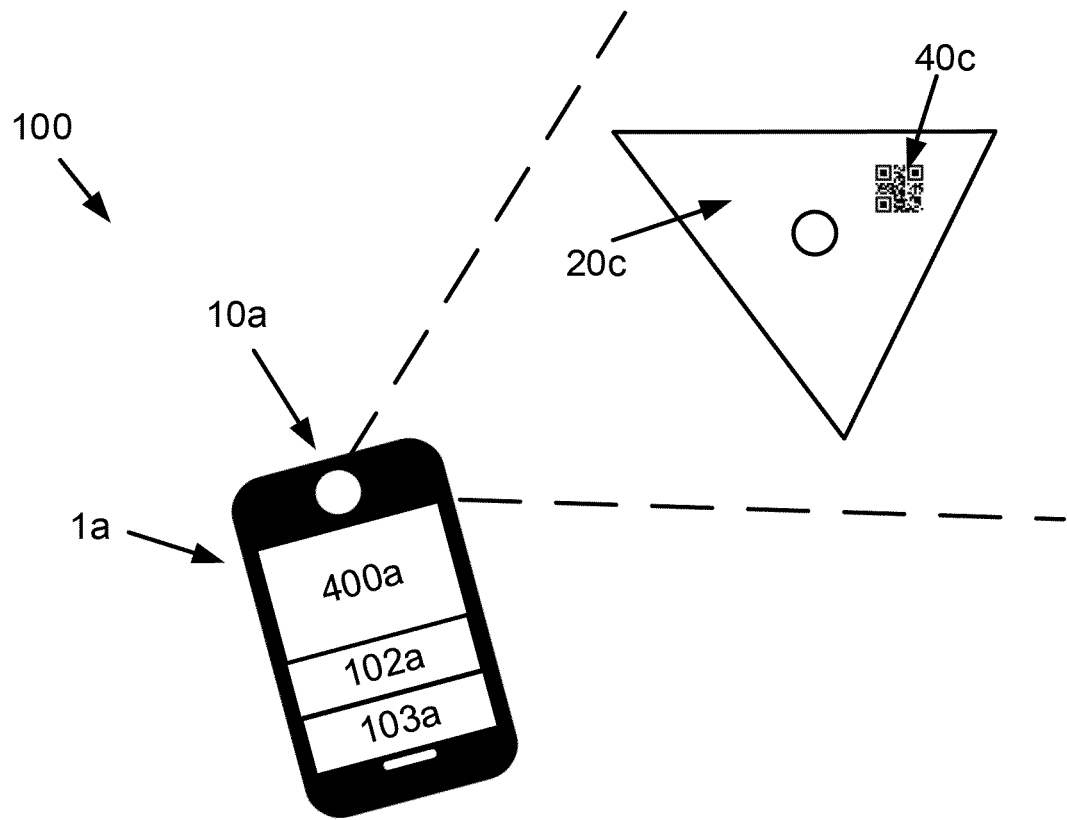
FIG. 4a illustrates an example system according to an embodiment of the present disclosure.
Figure 4B:
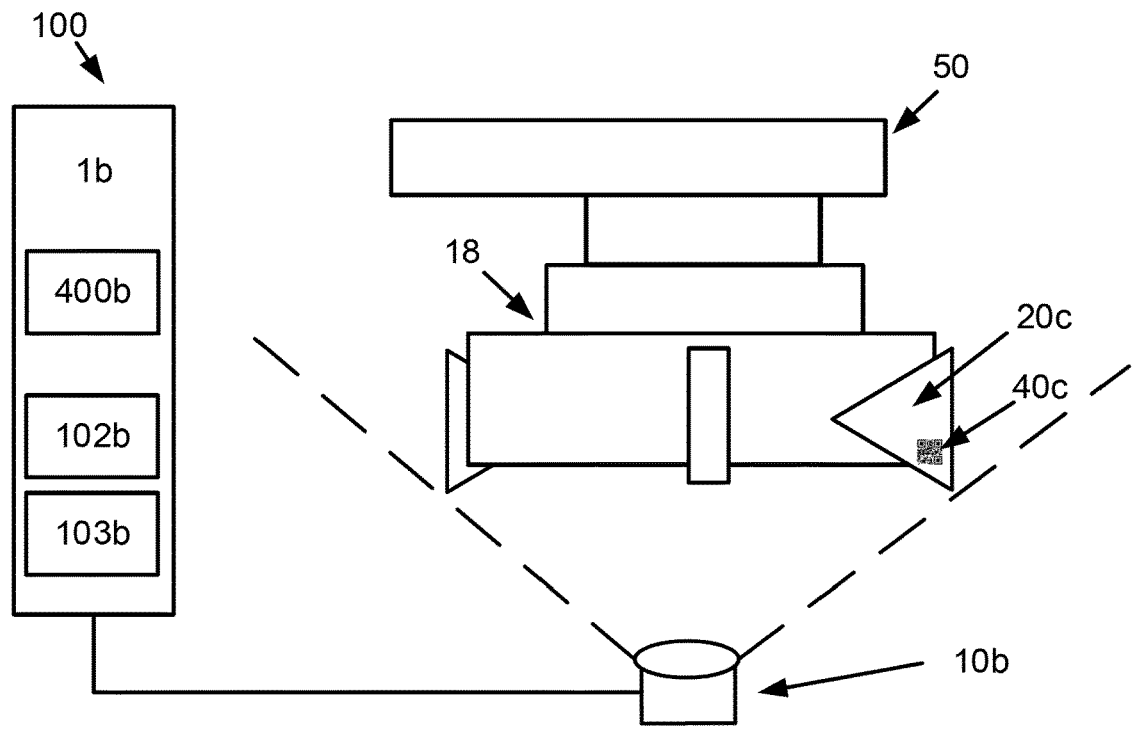
FIG. 4b illustrates an example system according to an embodiment of the present disclosure.
Figure 4C:
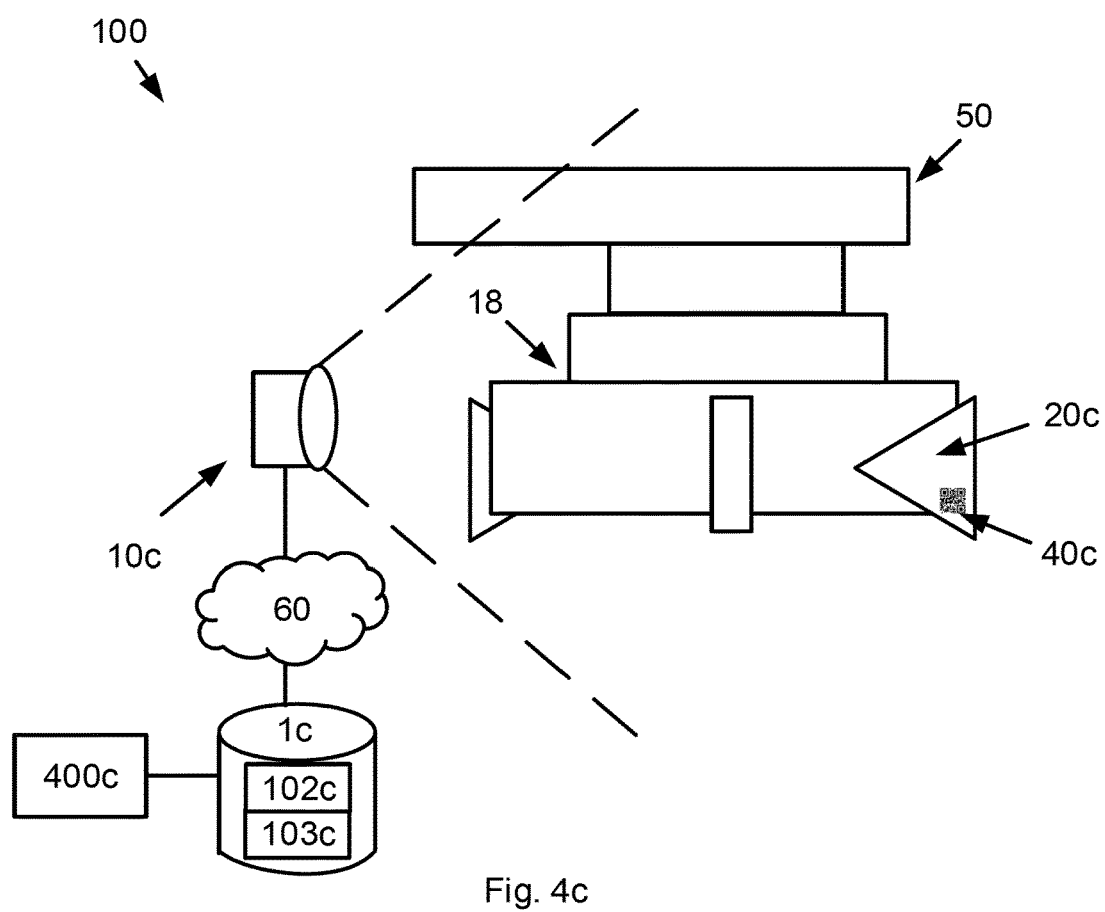
FIG. 4c illustrates an example system according to an embodiment of the present disclosure.

FIG. 4a-4c each illustrates an example system according to an embodiment of the present disclosure.

The system 100 comprises a camera 10a,10b,10c for obtaining image data and reading a machine readable code.

According to some embodiments the camera 10a,10b,10c is any of a camera based reader, a video camera reader, a charge-coupled device reader or a cell phone camera. According to some embodiments the camera 10a,10b,10c is a camera component integrated in an electronic device a stand-alone camera component. The camera 10a,10b,10c is configured for reading a machine readable code, arranged at a tool part 20a,20b,20c,20d, during usage of the tool part 20a,20b,20c,20d in a machine operation by a machine.

The system 100 further comprises an electronic device 1a,1b,1c configured to be connected with the camera 10a, 10b,10c. According to some embodiments the electronic device is a portable electronic device 1a. According to some embodiments electronic device is a local electronic device 1b. According to some embodiments the electronic device is a remote electronic device 1c. According to some embodiments the electronic device 1a,1b,1c is configured to be connected to a communication network 60.

FIG. 4a illustrates an electronic device 1a in form of a smartphone, tablet, cellular phone, feature phone or any portable electronic device. In one example, as illustrated in FIG. 4a, the camera device 10a is the camera of a smartphone 1a. In the example the electronic device 1a is a smartphone that is held by the machine operator. The electronic device can also be a local electronic device 1b, e.g. installed as a part of a machine 50 as illustrated in FIG. 4b. In one example, illustrated in FIG. 4b, the reader device 10b is a stand-alone reader device connected to the electronic device 1b and installed as a part of the machine 50. According to some embodiments the electronic device is a remote server 1c connected to a reader device 10c via the communication network 60 as illustrated in FIG. 4c. In an example the machine 50 is operated from a remote location e.g. within a factory.

According to some embodiments the communication network 60 is a wireless communication network. According to some embodiments the wireless communication network is a standardized wireless local area network such as a Wireless Local Area Network, WLAN, Bluetooth™, ZigBee, Ultra-Wideband, UWB, Radio Frequency Identification, RFID, or similar network. According to some embodiments the wireless communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments the wireless communication network can also be a combination of both a wireless local area network and a wireless wide area network. According to some embodiments communication network 60 can be a combination a wired communication network and a wireless communication network. According to some embodiments the communication network 60 is defined by common Internet Protocols.

The electronic device 1a,1b,1c having a processing circuitry 102a,102b,102c configured to cause the system 100 to detect, by the camera 10a,10b,10c, an identification marker 40a,40b,40c,40d at the tool part 20a,20b,20c,20d wherein the identification marker 40a,40b,40c,40d is a unique machine readable code, and read, by the camera 10a,10b, 10c, the unique machine readable code of the identification marker 40a,40b,40c,40d.

According to some embodiments the electronic device 1a,1b,1c further comprising a memory 103a,103b,103c.

According to some embodiments the individual dimension information data idID is stored in the memory 103a,103b, 103c.

The processing circuitry 102a,102b,102c is further configured to cause the system 100 to obtain, from the unique machine readable code, individual dimension information data idID comprising at least one individually measured dimension associated with the tool part 20a,20b,20c,20d as measured when manufacturing the tool part 20a,20b,20c, 20d.

Hence, with this embodiment a tool wear can be determined using the individual dimension information data comprising at least one individually measured dimension associated with the tool part as measured when manufacturing the tool part without a need for an initial measurement of the dimension of the tool part before usage of the tool part, since at least one individually measured dimension before usage of the tool part is already known. This in turn saves time and reduces measurement errors caused by e.g. a human, and the image processing of the image data of the tool part further reduces measurement errors caused by e.g. a human.

According to some embodiments, the processing circuitry 102a,102b,102c is further configured to cause the system 100 to obtain, by the camera 10a,10b,10c, image data of the tool part 20a,20b,20c,20d, obtain a current dimension information data cdID of the tool part 20a,20b,20c,20d comprising at least one current dimension associated with the tool part 20a,20b,20c,20d by performing image processing of the image data of the tool part 20a,20b,20c,20d, and determine tool wear data by comparing the current dimension information data cdID with the individual dimension information data idID of the tool part 20a,20b,20c,20d.

Hence, with this embodiment a tool wear can be determined by comparing a specific dimension associated with the tool part as measured when manufacturing that specific individual tool part and compare this dimension with the current dimension of the tool part, using the current dimension information data. This eliminates e.g. the need for an initial measurement of the dimension of the tool part before usage of the tool part which in turn saves time and reduces measurement errors caused by e.g. a human, and the image processing of the image data of the tool part further reduces measurement errors caused by e.g. a human.

According to some embodiments current dimension information data comprising a current dimension obtained from a scale included in the image data of the tool part. According to some aspects current dimension information data comprising a current dimension obtained using a built in measurement determination application of the electronic device. In an example current dimension information data comprising a current dimension that is obtained by using a movement sensor of the electronic device, such as a gyroscope or accelerometer, to determine of a movement of the electronic device while capturing the image data of the tool part. According to some embodiments the current dimension information data comprising a current dimension obtained using object recognition of the detected tool part included in the image data of the tool part, wherein the current dimension is determined by a user input via a user interface indicative of a measurement performed of the object recognized in the image data.

According to some embodiments the image processing of the image data of the tool part is using object recognition to identify the tool part 20a,20b,20c,20d and/or construction details of the tool part 20a,20b,20c,20d. According to some embodiments the image processing of the image data of the tool part 20a,20b,20c,20d is used to identify at least one part of the tool part 20a,20b,20c,20d that is associated with a dimension measurement as measured when manufacturing the tool part 20a,20b,20c,20d.

According to some embodiments the individual dimension information data idID is obtained by decoding the unique machine readable code of the identification marker 40a,40b,40c,40d and from the decoded information obtain the individual dimension information data idID.

Hence, with this embodiment information about the individual dimension can be coded and stored in the unique machine readable code itself that is available on the tool part.

According to some embodiments the individual dimension information data idID is obtained by comparing the unique machine readable code with association data the system comprises individual dimension information data idID associated with the unique machine readable code and obtaining the individual dimension information data idiD from a memory 103a,103b,103c.

Hence, with this embodiment information about the individual dimension can be stored in a memory that e.g. is a remote memory 103c, and the information data can be stored and managed by a tool part manufacturer for a tool part customer.

According to some embodiments the current dimension information data cdID of the tool part 20a,20b,20c,20d is determined by using the dimension of the identification marker 40a,40b,40c,40d itself as a dimension reference for obtaining at least one current dimension associated with the tool part 20a,20b,20c,20d.

Hence, with this embodiment the identification marker at the tool part can be obtained by the camera and comprised in the image data of the tool part to be used in the image processing of the image data of the tool part, and with knowledge of the dimension of the identification marker itself, the identification marker itself can be used as a scale for obtaining a current dimension associated with the tool part. This eliminates e.g. the need for an initial measurement of the dimension of the tool part before usage of the tool part and eliminates the need for a follow up manual measurement, which in turn saves time and reduces measurement errors caused by e.g. a human. The image processing of the image data of the tool part further reduces measurement errors caused by e.g. a human.

According to some embodiments the dimension of the identification marker itself is used in the image processing of the image data of the tool part for obtaining a current dimension associated with the tool part.

Figure 3:
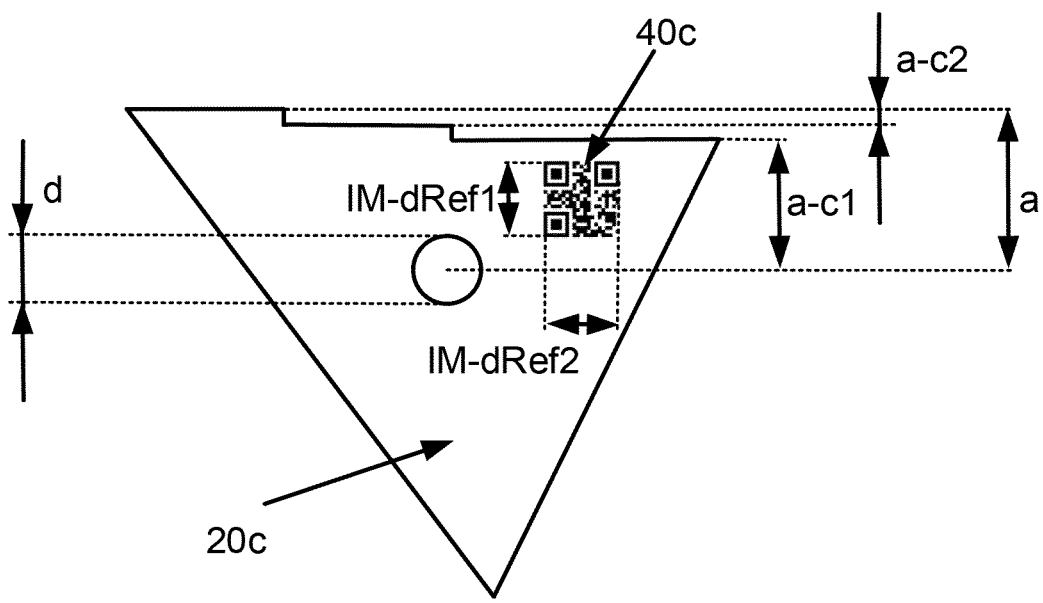
FIG. 3 illustrates an example worn tool part according to an embodiment of the present disclosure.

In an example, as illustrated in FIG. 3, the dimension of the identification marker itself IM-dRef1, IM-dRef2 is used in the image processing of the image data of the tool part 20c for obtaining the current dimension a-c1 associated with the tool part. According to some embodiments the relation to a current dimension is determined in relation to the dimension of the identification marker itself. In the example, as illustrated in FIG. 3, the relation a-c1:IM-dRef1 is determined by the image processing to be 2:1. According to some embodiments object recognition used to determine a relation between different dimensions in the image data of the tool part. With knowledge of the dimension of the identification marker itself e.g. IM-dRef1=6.44 mm, it can hence be determined that a-c1=12.88 mm using the relation 2:1 (a-c1=2×IM-dRef1=2×6.44).

According to some embodiments the dimension of the identification marker 40a,40b,40c,40d itself is measured when manufacturing the tool part 20a,20b,20c,20d and comprised in the individual dimension information data idID.

Hence, with this embodiment the need for a measurement of the dimension of the identification marker itself before or during usage of the tool part is eliminated, which saves time and reduces measurement errors caused by e.g. a human.

According to some embodiments the current dimension information data cdID of the tool part 20a,20b,20c,20d is determined by using at least one individually measured dimension of the tool part 20a,20b,20c,20d as measured when manufacturing the tool part 20a,20b,20c,20d as dimension reference for obtaining at least one current dimension associated with the tool part 20a,20b,20c,20d.

Hence, with this embodiment one individually measured dimension at the tool part can be obtained by the camera and be comprised in the image data of the tool part to be used in the image processing of the image data of the tool part, and with knowledge of the dimension of the individually measured dimension of the tool part as measured when manufacturing the tool part, the individually measured dimension can be used as a scale for obtaining a current dimension associated with the tool part. This eliminates e.g. the need for an initial measurement of the dimension of the tool part before usage of the tool part and eliminates the need for a follow up manual measurement, which in turn saves time and reduces measurement errors caused by e.g. a human. The image processing of the image data of the tool part further reduces measurement errors caused by e.g. a human.

According to some embodiments the individual dimension information data idID comprising at least the individually measured dimension associated with the tool part 20a,20b,20c,20d as measured when manufacturing the tool part 20a,20b,20c,20d, is used in the image processing of the image data of the tool part 20a,20b,20c,20d for obtaining the current dimension associated with the tool part 20a,20b,20c, 20d.

In an example, as illustrated in FIG. 3, individual dimension information data idID comprising at least the individually measured dimension "a" associated with the tool part 20c as measured when manufacturing the tool part 20c is used in the image processing of the image data of the tool part 20c for obtaining the current dimension a-c2 associated with the tool part. According to some embodiments the relation to a current dimension is determined in relation to an individually measured dimension of the tool part as measured when manufacturing the tool part. In the example, the relation a:a-c2 is determined by the image processing to be 8:1. With knowledge of the dimension "a" e.g. a=14.20 mm, it can hence be determined that a-c2=1.775 mm (a-c2=a/8=14.20/8).

According to some embodiments the dimension reference is a predetermined dimension of the tool part 20a,20b,20c, 20d that maintains unchanged while wearing the tool part 20a,20b,20c,20d.

Hence, with this embodiment a tool wear, based on one current dimension obtained by the image processing, can be determined using predetermined dimension of the tool part that is not worn by using the tool part which hence will continue to function as a dimension reference during the whole lifetime of the tool part.

According to some embodiments the predetermined dimension of the tool part 20a,20b,20c,20d that maintains unchanged is a dimension that is not worn when the tool part is used for processing a piece of material.

In the example as illustrated in FIG. 3, the dimension d is the predetermined dimension of the tool part 20c that maintains unchanged while wearing the tool part 20c. In the example the tool part is a cutting insert that comprises three cutting edges that are all worn when using the cutting insert. However, the dimension d, as illustrate din FIG. 3 remains unchanged.

According to some embodiments at least one individually measured dimension of the tool part as measured when manufacturing the tool part is used as dimension reference.

In an example, as illustrated in FIG. 3, the dimension d is the individually measured dimension of the tool part as measured when manufacturing the tool part. In the example the dimension d is used in the image processing of the image data of the tool part 20c for obtaining the current dimension a-c2 associated with the tool part. According to some embodiments the relation to a current dimension is determined in relation to an individually measured dimension of the tool part as measured when manufacturing the tool part. In the example, the relation d:a-c2 is determined by the image processing to be 5:1. With knowledge of the dimension "d" e.g. d=8.875 mm, it can hence be determined that a-c2=1.775 mm (a-c2=d/5=8.875/5).

According to some embodiments the identification marker 40a,40b,40c,40d at the tool part 20a,20b,20c,20d is a machine readable code that further comprises an orientation detection pattern for determining a relative direction of the tool part 20a,20b,20c,20d. According to some embodiments the identification marker 40a,40b,40c,40d is arranged at the tool part 20a,20b,20c,20d in a predefined direction for determining a direction of the tool part 20a,20b,20c,20d in relation to the identification marker 40a,40b,40c,40d at the tool part 20a,20b,20c,20d.

According to some embodiments the orientation detection pattern is used for determining a dimension in relation to the relative direction of the tool part 20a,20b,20c,20d. In the example as illustrated in FIG. 3, the orientation detection pattern is used for determining the current dimensions a-c1 and a-c2 in relation to the individually measured dimension "a" associated with the tool part 20c as measured when manufacturing the tool part 20c. In the example as illustrated in FIG. 3 the individually measured dimension "d" associated with the tool part 20c as measured when manufacturing the tool part 20c is independent on the orientation of the tool part.

According to some embodiments the orientation detection pattern is detected and read by the camera 10a,10b,10c to identify the relative direction of the tool part 20a,20b,20c, 20d in relation to the camera 10a,10b,10c. According to some embodiments, the camera 10a,10b,10c is arranged in a predetermined direction in relation to the machine 50 to determine the relative direction of the tool part 20a,20b,20c, 20d in relation to the machine 50.

According to some embodiments the electronic device 1a comprises the camera 10a. According to some embodiments the electronic device 1a comprises an orientation detection unit configured to determine the orientation of the electronic device 1a and the camera 10a. According to some embodiments the orientation detection unit is at least one of a gyroscope or an accelerometer. According to some embodiments the orientation of the tool part 20a,20b,20c,20d is determined in relation to a normal plane that is common with a normal plane of the electronic device 1a. According to some embodiments the orientation of the tool part 20a,20b, 20c,20d is determined in relation to a normal plane that is common with a normal plane of the machine 50. According to some embodiments the orientation of the tool part 20a, 20b,20c,20d is defined by a certain number of degrees in relation to a predefined plane.

Figure 5:
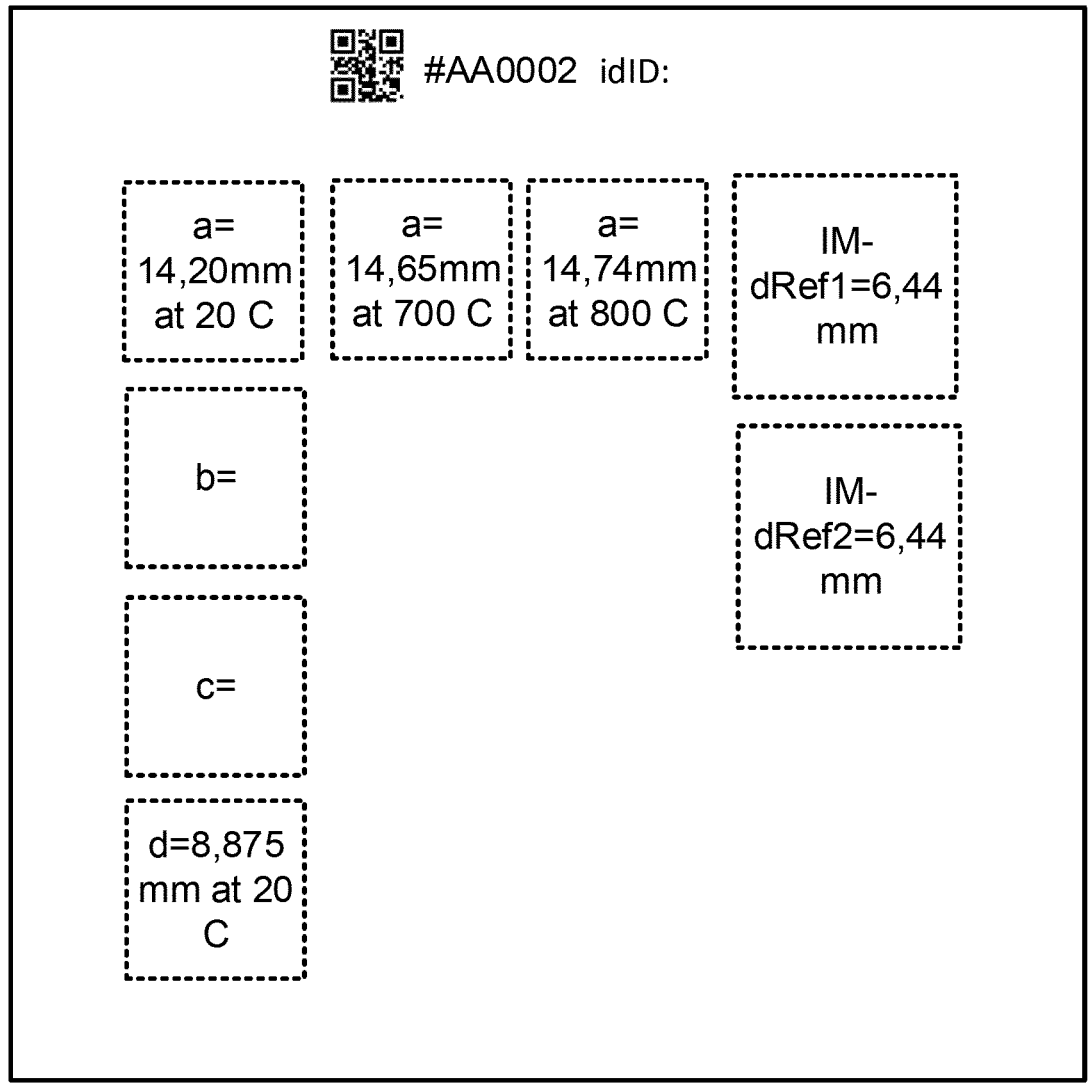
FIG. 5 illustrates example schematic data relations of associated individual dimension information data according to embodiments of the present disclosure.

FIG. 5 illustrates example schematic data relations of associated individual dimension information data. FIG. 5a illustrates an example identification marker with the unique machine readable code of "AA0002". According to some embodiments the individual dimension information data idID comprises plurality of individually measured dimensions of the tool part 20a,20b,20c,20d as measured when manufacturing the tool part 20a,20b,20c,20d. The example identification marker with the unique machine readable code of "AA0002" is associated with individual dimension information data idID a=14.20 mm measured at 20 degrees centigrade, d=8.875 mm measured at 20 degrees centigrade, etc. The dimensions a and d are just two examples of plurality of individually measured dimensions of the tool part as measured when manufacturing the tool part. In the example the dimension of the identification marker itself is measured when manufacturing the tool part and comprised in the individual dimension information data idID as IM-dRef1=6.44 mm and IM-dRef2=6.44 mm.

According to some embodiments the system 100 is configured to determine a tool wear of the tool part 20a,20b, 20c,20d during usage of the tool part 20a,20b,20c,20d in a machine operation. For an example, a cutting insert is worn when the cutting insert process the piece of material, and while the processing the piece of material the cutting insert can be at a high temperature, e.g. 700 degrees centigrade.

According to some embodiments the individually measured dimension of the tool part 20a,20b,20c,20d is associated with a dimension at a certain temperature. In an example, the dimension of the tool part may vary dependent on the temperature of the tool part, e.g. the tool part may expand at a higher temperature. According to some embodiments the individually measured dimension of the tool part 20a,20b,20c,20d is associated with a dimension at a certain temperature and/or a relation to a function for determining a dimension at a certain temperature. According to some embodiments the expansion of a dimension of the tool part at a certain temperature is predetermined and part of the individual dimension information data idID. In FIG. 5 the dimension a=14.65 mm at 700 degrees centigrade and the dimension a=14.74 mm at 800 degrees centigrade. This information can e.g. be used for determining the current dimension when the tool part 20a,20b,20c,20d has a certain temperature.

According to some embodiments the system 100 comprises a temperature sensor device configured to determine the current temperature of the tool part 20a,20b,20c,20d, and the processing circuitry 102a,102b,102c is configured to cause the system 100 to obtain from the unique machine readable code, individual dimension information data idID comprising at least one individually measured dimension associated with the tool part 20a,20b,20c,20d as measured when manufacturing the tool part 20a,20b,20c,20d wherein the at least one individually measured dimension associated with the tool part 20a,20b,20c,20d is further dependent to the current temperature of the tool part 20a,20b,20c,20d. According to some embodiments the temperature sensor device is any of an infrared camera or a thermometer. According to some embodiments the camera 10a,10b,10c is configured to obtain the current temperature of the tool part 20a,20b,20c,20d.

According to some embodiments the processing circuitry 102a,102b,102c is further configured to cause the system 100 to output the determined tool wear of the tool part 20a,20b,20c,20d via a user interface 400a,400b,400c of the electronic device 1a,1b,1c.

According to some embodiments the processing circuitry 102a,102b,102c is further configured to output the determined tool wear of the tool part 20a,20b,20c,20d as input data to a machine, connectable to the electronic device 1a,1b,1c, configured to perform an operation of the tool part 20a,20b,20c,20d.

Figure 6:
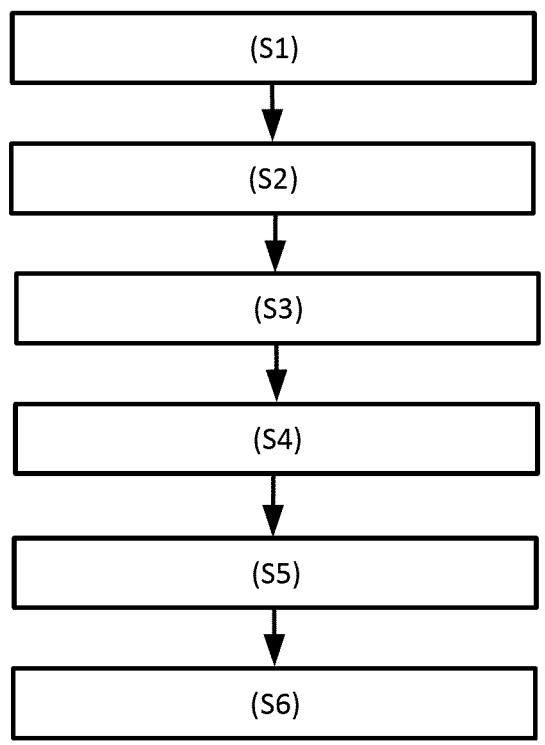
FIG. 6 illustrates a flow chart of example method steps according to embodiments of the present disclosure.

The third aspect of this disclosure shows a method for utilizing an identification marker 40a,40b,40c,40d on a tool part 20a,20b,20c,20d for determining a tool wear of the tool part 20a,20b,20c,20d. FIG. 6 illustrates a flow chart of example method steps according to the third aspect of the disclosure.

The method comprising the step of S1: detecting, by a camera 10a,10b,10c, an identification marker 40a,40b,40c, 40d at a tool part 20a,20b,20c,20d wherein the identification marker 40a,40b,40c,40d is a unique machine readable code, the step of S2: reading, by the camera 10a,10b,10c, the unique machine readable code of the identification marker 40a,40b,40c,40d and the step of S3: obtaining, from the unique machine readable code, individual dimension information data idID comprising at least one individual dimension associated with the tool part 20a,20b,20c,20d as measured when manufacturing the tool part 20a,20b,20c,20d. The method further comprising the step of S4: obtaining, by the camera 10a,10b,10c, image data of the tool part 20a, 20b,20c,20d, the step of S5: obtaining a current dimension information data cdID of the tool part 20a,20b,20c,20d comprising at least one current dimension associated with the tool part 20a,20b,20c,20d by performing image processing of the image data of the tool part 20a,20b,20c,20d; and the step of S6: determining tool wear data by comparing the current dimension information data cdID with the individual dimension information data idID of the tool part 20a,20b, 20c,20d.

Hence, with this embodiment a tool wear can be determined by comparing a specific dimension associated with the tool part as measured when manufacturing that specific individual tool part and compare this dimension with the current dimension of the tool part, using the current dimension information data. This eliminates e.g. the need for an initial measurement of the dimension of the tool part before usage of the tool part which in turn saves time and reduces measurement errors caused by e.g. a human, and the image processing of the image data of the tool part further reduces measurement errors caused by e.g. a human.

According to some embodiments wherein the current dimension information data cdID of the tool part 20a,20b, 20c,20d is determined by using the actual dimension of the identification marker 40a,40b,40c,40d itself as a dimension reference for obtaining at least one current dimension associated with the tool part 20a,20b,20c.

Hence, with this embodiment the identification marker at the tool part can be obtained by the camera and be comprised in the image data of the tool part to be used in the image processing of the image data of the tool part, and with knowledge of the dimension of the identification marker itself, the identification marker itself can be used as a scale for obtaining a current dimension associated with the tool part. This eliminates e.g. the need for an initial measurement of the dimension of the tool part before usage of the tool part and eliminates the need for a follow up manual measurement, which in turn saves time and reduces measurement errors caused by e.g. a human. The image processing of the image data of the tool part further reduces measurement errors caused by e.g. a human.

According to some embodiments wherein the dimension of the identification marker 40a,40b,40c,40d itself is measured when manufacturing the tool part 20a,20b,20c,20d and comprised in the individual dimension information data idID.

Hence, with this embodiment the need for a measurement of the dimension of the identification marker itself before or during usage of the tool part is eliminated, which saves time and reduces measurement errors caused by e.g. a human.

According to some embodiments the current dimension information data cdID of the tool part 20a,20b,20c,20d is determined by using at least one individually measured dimension of the tool part 20a,20b,20c,20d as measured when manufacturing the tool part 20a,20b,20c,20d as dimension reference for obtaining at least one current dimension associated with the tool part 20a,20b,20c,20d.

Hence, with this embodiment one individually measured dimension at the tool part can be obtained by the camera and comprised in the image data of the tool part to be used in the image processing of the image data of the tool part, and with knowledge of the dimension of the individually measured dimension of the tool part as measured when manufacturing the tool part, the individually measured dimension can be used as a scale for obtaining a current dimension associated with the tool part. This eliminates e.g. the need for an initial measurement of the dimension of the tool part before usage of the tool part and eliminates the need for a follow up manual measurement, which in turn saves time and reduces measurement errors caused by e.g. a human. The image processing of the image data of the tool part further reduces measurement errors caused by e.g. a human.

According to some embodiments the dimension reference is a predetermined dimension of the tool part 20a,20b,20c, 20d that maintains unchanged while wearing the tool part 20a,20b,20c,20d.

Hence, with this embodiment a tool wear, based on one current dimension obtained by the image processing, can be determined using predetermined dimension of the tool part that is not worn by using the tool part which hence will continue to function as a dimension reference during the whole lifetime of the tool part.

Figure 7:
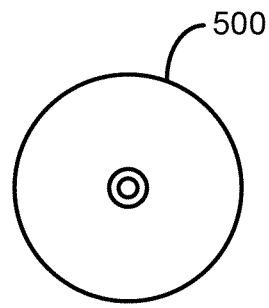
FIG. 7 illustrates an example computer program product according to embodiments of the present disclosure.

The fourth aspect of this disclosure shows a computer program product the third aspect comprising a non-transitory computer readable medium, having thereon a computer program comprising program instructions, the computer program being loadable into a processing circuitry 102a, 102b,102c and configured to cause execution of the method when the computer program is run by the processing circuitry 102a,102b,102c. FIG. 7 illustrates an example computer program product according to the fourth aspect of the disclosure.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A system for utilizing an identification marker on a tool part for a cutting tool for determining a tool wear of the tool part, the system comprising:
   a camera for obtaining image data and reading a unique machine readable code;
   an electronic device configured to be connected with the camera, the electronic device having a processing circuitry configured to cause the system to:
   detect, by the camera, the identification marker at the tool part, wherein the identification marker is the unique machine readable code;
   read, by the camera, the unique machine readable code of the identification marker;
   obtain, from the unique machine readable code, individual dimension information data including at least one individually measured dimension associated with the tool part as measured when manufacturing the tool part;
   obtain, by the camera, image data of the tool part;
   obtain current dimension information data of the tool part including at least one current dimension associated with the tool part by performing image processing of the image data of the tool part; and
   determine tool wear data by comparing the current dimension information data with the individual dimension information data of the tool part.

2. The system according to claim 1, wherein the individual dimension information data is obtained by decoding the unique machine readable code of the identification marker.

3. The system according to claim 1, wherein the current dimension information data of the tool part is determined by using a dimension of the identification marker itself as a dimension reference for obtaining at least one current dimension associated with the tool part.

4. The system according to claim 3, wherein the dimension of the identification marker itself is measured when manufacturing the tool part and comprised in the individual dimension information data.

5. The system according to claim 1, wherein the current dimension information data of the tool part is determined by using at least one individually measured dimension of the tool part as measured when manufacturing the tool part as a dimension reference for obtaining at least one current dimension associated with the tool part.

6. The system according to claim 5, wherein the dimension reference is a predetermined dimension of the tool part that maintains unchanged while wearing down the tool part.

7. A method for utilizing an identification marker on a tool part for determining a tool wear of the tool part, the method comprising:
   detecting, by a camera, the identification marker at a tool part, wherein the identification marker is a unique machine readable code;
   reading, by the camera, the unique machine readable code of the identification marker;
   obtaining, from the unique machine readable code, individual dimension information data including at least one individual dimension associated with the tool part as measured when manufacturing the tool part;
   obtaining, by the camera, image data of the tool part;
   obtaining current dimension information data of the tool part including at least one current dimension associated with the tool part by performing image processing of the image data of the tool part; and
   determining tool wear data by comparing the current dimension information data with the individual dimension information data of the tool part.

8. The method according to claim 7, wherein the current dimension information data of the tool part is determined by using an actual a dimension of the identification marker itself as a dimension reference for obtaining at least one current dimension associated with the tool part.

9. The method according to claim 8, wherein the dimension of the identification marker itself is measured when manufacturing the tool part and comprised in the individual dimension information data.

10. The method according to claim 7, wherein the current dimension information data of the tool part is determined by using at least one individually measured dimension of the tool part as measured when manufacturing the tool part as a dimension reference for obtaining at least one current dimension associated with the tool part.

11. The method according to claim 10, wherein the dimension reference is a predetermined dimension of the tool part that maintains unchanged while wearing down the tool part.

12. A computer program product comprising a non-transitory computer readable medium, having thereon a computer program including program instructions, the computer program being loadable into a processing circuitry and configured to cause execution of the method according to claim 7 when the computer program is run by the processing circuitry.

\* \* \* \* \*